US010545293B2

(12) United States Patent
Logunov et al.

(10) Patent No.: US 10,545,293 B2
(45) Date of Patent: Jan. 28, 2020

(54) ASSEMBLIES, OPTICAL CONNECTORS AND METHODS OF BONDING OPTICAL FIBERS TO SUBSTRATES (71) Applicant: CORNING INCORPORATED, Corning, NY (US)

(72) Inventors: Stephan Lvovich Logunov, Corning, NY (US); Mark Alejandro Quesada, Horseheads, NY (US); Alexander Mikhailovich Streltsov, Corning, NY (US); Douglas Llewellyn Butler, Painted Post, NY (US); James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/410,903

(22) Filed: May 13, 2019

(65) Prior Publication Data
US 2019/0271814 A1 Sep. 5, 2019

Related U.S. Application Data (63) Continuation of application No. 15/897,823, filed on Feb. 15, 2018, now Pat. No. 10,345,533.

(51) Int. Cl.
G02B 6/38 (2006.01)
G02B 6/36 (2006.01)
(Continued)

(52) U.S. Cl.
CPC ....... *G02B 6/3636* (2013.01); *G02B 6/02209* (2013.01); *G02B 6/30* (2013.01);
(Continued)

(58) Field of Classification Search
CPC ........ G02B 6/02209; G02B 6/30; G02B 6/32; G02B 6/3636; G02B 6/3861; G02B 6/4212; G02B 6/4238
See application file for complete search history.

(56) References Cited

U.S. PATENT DOCUMENTS 4,785,219 A 11/1988 Soemers et al.
5,389,193 A * 2/1995 Coucoulas ........... G02B 6/3652
216/24
(Continued)

FOREIGN PATENT DOCUMENTS

CN 203109443 U 8/2013
GB 2453945 A 4/2009
(Continued)

OTHER PUBLICATIONS

International Search Report and Written Opinion of the International Searching Authority; PCT/US2019/017803; dated May 16, 2019; 13 Pages; European Patent Office.
(Continued)

*Primary Examiner* — Daniel Petkovsek
(74) *Attorney, Agent, or Firm* — Adam R. Weeks (57) ABSTRACT

Assemblies, optical connectors, and methods for bonding optical fibers to a substrate using a laser beam are disclosed. In one embodiment, a method of bonding an optical fiber to a substrate includes directing a laser beam into the optical fiber disposed on a surface of the substrate, wherein the optical fiber has a curved surface and the curved surface of the optical fiber focuses the laser beam to a diameter that is smaller than a diameter of the laser beam as it enters the optical fiber. The method further includes melting, using the laser beam, a material of the substrate at a bond area between the optical fiber and the surface of the substrate such that the optical fiber is bonded to the surface of the substrate.

16 Claims, 10 Drawing Sheets (51) Int. Cl.
*G02B 6/02* (2006.01)
*G02B 6/30* (2006.01)
*G02B 6/42* (2006.01)

(52) U.S. Cl.
CPC ......... *G02B 6/3861* (2013.01); *G02B 6/4212* (2013.01); *G02B 6/4238* (2013.01)

(56) References Cited

U.S. PATENT DOCUMENTS

| | | | |
|---|---|---|---|
| 6,411,759 B1* | 6/2002 | Beguin | G02B 6/2551 |
| | | | 385/49 |
| 6,582,548 B1* | 6/2003 | Dautartas | C03C 27/02 |
| | | | 156/272.8 |
| 6,631,228 B2 | 10/2003 | Gao et al. | |
| 6,863,209 B2 | 3/2005 | Rinne et al. | |
| 7,505,650 B1 | 3/2009 | Grzybowski et al. | |
| 9,515,286 B2 | 12/2016 | Dabich, II et al. | |
| 2002/0000427 A1 | 1/2002 | Akhavain et al. | |
| 2002/0069497 A1* | 6/2002 | Musk | G02B 6/3636 |
| | | | 29/25.01 |
| 2002/0110331 A1 | 8/2002 | Farrelly et al. | |
| 2002/0136500 A1* | 9/2002 | Gratrix | G02B 6/32 |
| | | | 385/73 |
| 2003/0235388 A1* | 12/2003 | Lee | G02B 6/3839 |
| | | | 385/137 |
| 2007/0201797 A1 | 8/2007 | Grzybowski et al. | |
| 2012/0045169 A1* | 2/2012 | Hu | B23K 1/0008 |
| | | | 385/33 |
| 2013/0170789 A1* | 7/2013 | Kuang | G02B 6/3636 |
| | | | 385/14 |
| 2014/0377988 A1 | 12/2014 | Vaccaro et al. | |
| 2016/0054216 A1 | 2/2016 | Sokol et al. | |
| 2016/0268541 A1 | 9/2016 | Dabich, II et al. | |
| 2017/0216971 A1 | 8/2017 | DeMuth et al. | |

FOREIGN PATENT DOCUMENTS

| | | | |
|---|---|---|---|
| JP | 2002022995 A * | 1/2002 | ............... G02B 6/24 |
| WO | 2016209890 A1 | 12/2016 | |
| WO | 2017035106 A1 | 3/2017 | |
| WO | 2017040475 A1 | 3/2017 | |

OTHER PUBLICATIONS

Richter et al; "Ultrashort Pulse Induced Laser Welding of Glasses Without Optical Contacting"; Proc. of SPIE, vol. 10094; pp. 1009411-1-1009411-8; (2017.

Shen, Ninggang et al., "Selective Laser Melting of Fiber-Reinforced Glass Composites", Mnfg Letters, vol. 14, Oct. 2017, pp. 6-9, found at https://www.sciencedirect.com/science/article/pii/S2213846317300202 (Oct. 2017).

* cited by examiner

ASSEMBLIES, OPTICAL CONNECTORS AND METHODS OF BONDING OPTICAL FIBERS TO SUBSTRATES

CROSS-REFERENCE TO RELATED APPLICATIONS

The present application is a continuation of U.S. patent application Ser. No. 15/897,823 filed on Feb. 15, 2018 and entitled "ASSEMBLIES, OPTICAL CONNECTORS AND METHODS OF BONDING OPTICAL FIBERS TO SUBSTRATES," which is incorporated by reference herein in its entirety.

BACKGROUND

The present disclosure generally relates to methods for securing optical fibers to substrates and, more particularly methods for bonding optical fibers to substrates using a laser beam, and optical fiber connectors and assemblies comprising optical fibers bonded to substrates using a laser beam.

Benefits of optical fiber include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between an optical cable assembly and an electronic device.

Optical connectors may include optical fibers secured to a substrate. Typically, the optical fibers are secured to the substrate using an adhesive, which have a high coefficient of thermal expansion. The optical connectors may then be connected to another optical device to provide optical communication between optical devices. In one example, the optical connector is connected to an edge of a waveguide substrate having waveguides providing optical channels. The waveguide substrate may be a component of a photonic integrated circuit assembly, for example. In some cases, the connected optical connector and the optical device may be subjected to elevated temperatures, such as during a solder reflow process. The high CTE adhesive may cause the position of the optical fibers to shift due to the elevated temperatures and become misaligned with the optical channels of the optical device. The shifting of the optical fibers may prevent optical signals from passing between the optical connector and the optical device.

SUMMARY

Embodiments of the present disclosure are directed to methods for bonding one or more optical fibers to a substrate using a laser beam, as well as optical connectors and assemblies resulting from said methods. Particularly, the optical fiber acts as a cylindrical lens to focus the laser beam into the substrate. The focused laser beam melts the substrate material, which also causes the melted substrate material to diffuse into the material of the optical fiber. Thus, the optical fiber is bonded to the substrate using a laser welding process. The cylindrical lens provided by the optical fiber may eliminate the need to have a complicated optical delivery system to locally focus the laser beam into the substrate material. Optical connectors and assemblies comprising one or more optical fibers bonded to a substrate using a laser beam are also disclosed.

In this regard, in one embodiment, an assembly includes a substrate having a surface, an optical fiber bonded to the surface of the substrate, wherein the optical fiber comprises a curved surface, and a bond area between the optical fiber and the surface of the substrate. The bond area includes laser-melted material of the substrate and the optical fiber that bonds the optical fiber to the substrate.

In another embodiment, an optical connector includes a substrate having a surface, an optical fiber bonded to the surface of the substrate, wherein the optical fiber comprises a curved surface, and a bond area between the optical fiber and the surface of the substrate. The bond area includes laser-melted material of the substrate and the optical fiber that bonds the optical fiber to the substrate.

In yet another embodiment, a method of bonding an optical fiber to a substrate includes directing a laser beam into the optical fiber disposed on a surface of the substrate, wherein the optical fiber has a curved surface, and the optical fiber focuses the laser beam to a diameter that is smaller than a diameter of the laser beam as it enters the optical fiber. The method further includes melting, using the laser beam, a material of the substrate and the optical fiber at a contact area between the optical fiber and the surface of the substrate such that the optical fiber is bonded to the surface of the substrate at a bond area.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Embodiments described herein are directed to methods for bonding optical fibers to substrates using a laser beam as well as optical fiber connectors and assemblies including optical fibers bonded to substrates using a laser beam. Embodiments of the present disclosure enable optical fibers, which have a curved shape, to be bonded to a flat substrate without the use of adhesives having a high coefficient of thermal expansion (CTE). It may be desirable to subject an optical connector incorporating optical fibers secured to a substrate to a high temperature process, such as a solder reflow process. As an example and not a limitation, a connector may be attached to an optical assembly, such as an edge of a waveguide substrate of a photonic integrated circuit assembly. The photonic integrated circuit assembly and a main circuit board may be subjected to a solder reflow process after the connector is attached to waveguide substrate of the photonic integrated circuit assembly. For effective optical communication between the optical connector and the optical channels of the photonic integrated circuit assembly (or other optical assembly), the optical fibers should be aligned to the optical channel of the photonic integrated circuit assembly with sub-micron accuracy. If a high-CTE adhesive is used to secure the optical fibers to the substrate of the optical connector, the elevated temperatures of the solder reflow process may cause expansion of the high-CTE adhesive. This may then cause the optical fibers to move, which can then cause the optical fibers to become misaligned with respect to the optical channels of the photonic integrated circuit assembly (or other optical assembly).

Embodiments of the present disclosure provide for a fixed attachment procedure that does not rely on high-CTE adhesives and enables the optical fibers and substrate to be subjected to elevated temperatures, such as a solder reflow process. In embodiments, a laser beam is focused by the curved surface of the optical fiber such that a focused diameter of the laser beam is smaller at a contact area between the optical fiber and the substrate than the initial diameter of the laser beam. A film layer may be provided on a surface of the substrate that absorbs the laser beam, causing the surface of the substrate to melt. The material of the substrate diffuses into the material of the optical fiber, thereby causing the optical fiber to be bonded to the substrate. Thus, the embodiments described herein enable the bonding of geometrically different components (i.e., curved optical fibers to a flat substrate) using dissimilar materials (e.g., fused silica optical fibers and a glass substrates). As used herein, the term "melt" means that the material is modified by heating in any manner that bonds the optical fiber to the substrate, and includes, but is not limiting to, actual melting of the material as well as visco-elastic swelling of the material.

Various embodiments of methods for bonding optical fibers to substrates using a laser and assemblies comprising a plurality of optical fibers bonded to a substrate are described in detail herein.

Figure 1:
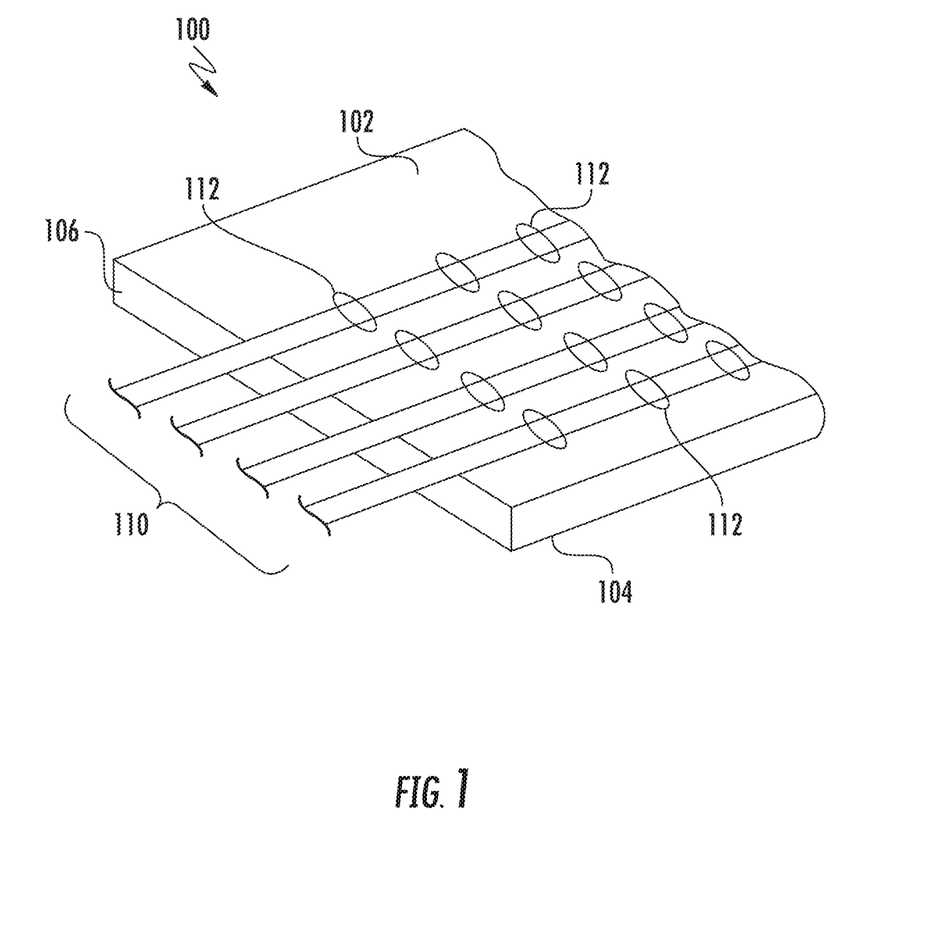
FIG. 1 schematically depicts a perspective view of an assembly comprising a plurality of optical fibers bonded to a substrate by a laser welding process according to one or more embodiments described and illustrated herein.
Figure 11:
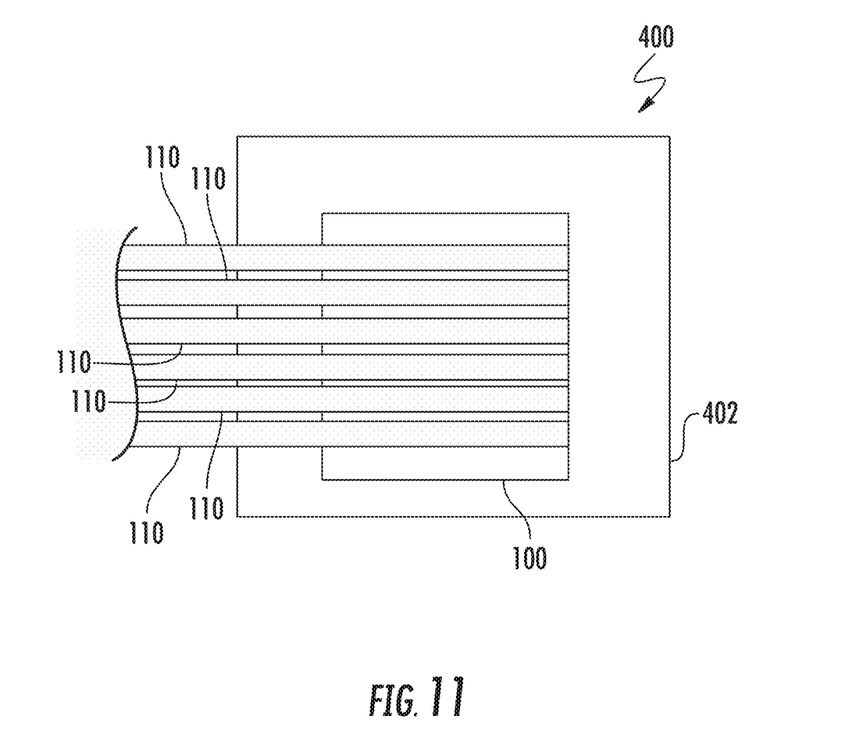
FIG. 11 schematically depicts a connector having an assembly comprising a plurality of optical fibers bonded to a substrate by a laser welding process according to one or more embodiments described and illustrated herein.

Referring now to FIG. 1, a partial perspective view of a substrate 100 with a plurality of optical fibers 110 bonded thereto is schematically depicted. As an example and not a limitation, the substrate 100 and the plurality of optical fibers 110 may be incorporated into a fiber optic connector, as illustrated schematically in FIG. 11. For example, the optical fiber connector 400 may include a housing 402 and the substrate 100 and at least a portion of the optical fibers 110 may be located in the housing 402. It should be understood that embodiments described herein are not limited to fiber optic connectors. The optical fiber and substrate assemblies may be incorporated into other optical devices.

The example substrate 100 depicted in FIG. 1 comprises a first surface 102, a second surface 104 opposite the first surface 102 and at least one edge 106 extending between the first surface 102 and the second surface 104. The substrate may be made of any low melting temperature material capable of diffusing into the material of the optical fiber 110. Generally, the melting temperature of the substrate 100 should be lower than the melting temperature of the optical fiber. An example non-limiting material for the optical fiber 110 is fused silica. Example materials for the substrate 100 include, but are not limited to, glass, silica, and silicon. Non-limiting glass materials include alkaline earth boro-aluminosilicate glass (e.g., as manufactured and sold under the trade name Eagle XG® by Corning Incorporated of Corning, N.Y.) and alkali-aluminosilicate glass (e.g., as manufactured and sold by Corning Incorporated of Corning, N.Y. under the trade name Gorilla® Glass). As non-limiting examples, the softening point for Eagle XG® is about 970 C. Other non-limiting examples of glass include BK7 glass, soda lime and other glasses with flat or polished surfaces. For such glasses, the softening point may be within a range of about 650 C to about 800 C, including endpoints. The softening point for fused silica is about 1715 C, so any glass with softening point less than 1500-1600 C may be acceptable. It should be understood that the substrate 100 may be made of other low-melting temperature materials.

The thickness of the substrate 100 is not limited by this disclosure. The thickness of the substrate 100 may be any thickness as desired for the end-application of the optical fiber 110 and substrate 100 assembly.

The plurality of optical fibers 110 are bonded to the first surface 102 of the substrate 100 by one or more laser bonding processes as described in detail below. If needed, the optical fibers 110 are stripped of any jacket or outer layers to remove high CTE material. Although FIG. 1 depicts four optical fibers 110, it should be understood that any number of optical fibers 110 may be bonded to a surface of the substrate 100 (i.e., one or more optical fibers 110). It should also be understood that the optical fibers 110 may be bonded to the second surface 104, or both the first surface 102 and the second surface 104.

The optical fibers 110 may be fabricated from any material having a higher melting temperature than that of the substrate 100. As noted above, the optical fibers 110 may be fabricated from fused silica. The optical fibers 110 have a round shape in cross section. However, the optical fibers 110 may be elliptical in shape. As described in more detail below, the optical fibers 110 should have at least one curved surface that focus a laser beam to a focused diameter such that a size (e.g., a diameter) of the laser beam at the contact area between the optical fiber 110 and the first surface 102 of the substrate 100 is smaller than a size of the initial diameter of the laser beam as it enters the optical fiber 100.

Each optical fiber 110 is bonded to the first surface 102 of the substrate 100 at one or more bond areas 112 (also called a bond area or an additional bond area) along the length of the optical fiber 110. It is noted that the bond areas 112 are denoted by ellipses in FIG. 1. As described in detail below, the bond areas 112 are regions of the first surface 102 of the substrate 100 where the optical fiber 110 contacts the first surface 102 of the substrate 100 and the material of the substrate 100 is laser-melted (i.e., melting caused by a laser beam) and diffused into the material of the optical fiber 110. The bond areas 112, which includes laser-melted material caused by the application of a laser beam, weld the optical fiber 110 to the first surface 102. It is noted that, in some embodiments, heating of a contact area 113 between optical fiber 110 and the first surface 102 of the substrate 100 may be provided by application of electromagnetic energy (e.g., microwaves) rather than a laser beam.

Any number of bond areas 112 may be provided along the length of the optical fiber 110. Bonding the optical fibers 110 to the surface of the substrate 100 eliminates the need for high CTE adhesives or organic materials, such as epoxy, to secure the optical fibers 110 to the substrate 100. Therefore, the assembly of the substrate 100 and the optical fibers 110 may be subjected to elevated temperatures of a solder reflow process without movement of the optical fibers 110 due to the presence of high CTE epoxy or other high CTE material.

Figure 2:
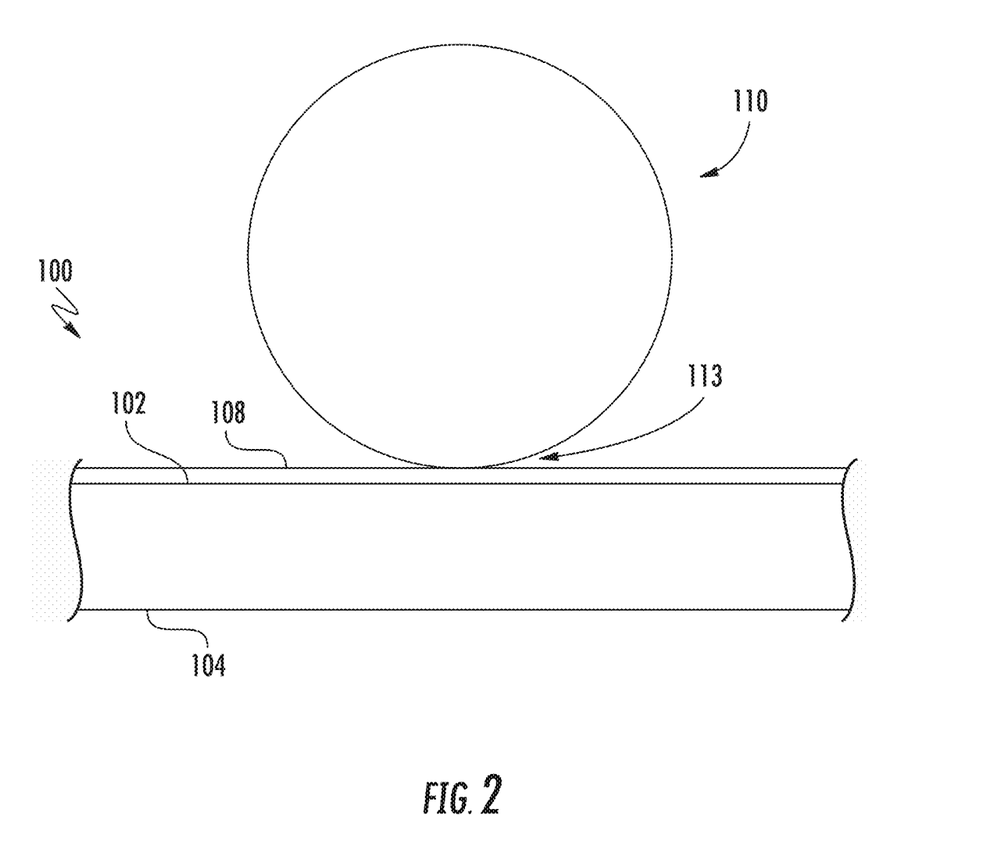
FIG. 2 schematically depicts an end view of an optical fiber positioned on a film layer disposed on a surface of a substrate according to one or more embodiments described and illustrated herein.

Referring now to FIGS. 2-5, an example process for laser welding optical fibers 110 to a substrate 100 is schematically illustrated. Referring first to FIG. 2, an end view of an optical fiber 110 disposed on a substrate 100 is schematically depicted. A film layer 108 is deposited on the first surface 102 (or the second surface 104). The film layer 108 is configured to absorb a wavelength of the laser beam, and raise the temperature of the first surface 102 to locally heat and melt the substrate 100, as described in more detail below and illustrated in FIGS. 3 and 4. The material of the film layer 108 should be chosen such that it is absorptive to the wavelength of the laser beam. As a non-limiting example, the film layer 108 may have an absorbance of greater than or equal to 10% as measured by reflectance and transmission of the sample. The absorbance is calculated as 100% minus the transmission value minus the reflectance value.

The thickness of the film layer 108 is not limited by this disclosure. It is noted that the thickness of the film layer 108 is exaggerated in FIGS. 2 and 4 for illustrative purposes. As a non-limiting example, the thickness of the film layer 108 may be less than or equal to 1 μm. In other embodiments, the thickness of the film layer 108 may be less than or equal to about 1.5 μm. Non-limiting materials for the film layer 108 include metals (e.g., stainless steel), glasses (e.g., low melting glass (LMG)), ZnO, $TiO_2$, $Nb_2O_5$), an electromagnetic-absorbing oxide material, and an electromagnetic-absorbing nitride material, among others. The material and thickness of the film layer 108 should be such that the material of the substrate 100 at the first surface 102 melts due to the absorption of the laser beam by the film layer 108.

Still referring to FIG. 2, an optical fiber 110 is disposed on the film layer 108 such that a contact area 113 is defined by contact between the optical fiber 110 and the film layer 108. The contact area 113 generally extends along the length of the optical fiber 110 that it is in contact with the film layer 108. It is noted that, in some embodiments, no film layer 108 is provided and the optical fiber(s) 110 is disposed directly on the first surface 102 (and/or second surface 104) of the substrate 100.

Figure 3:
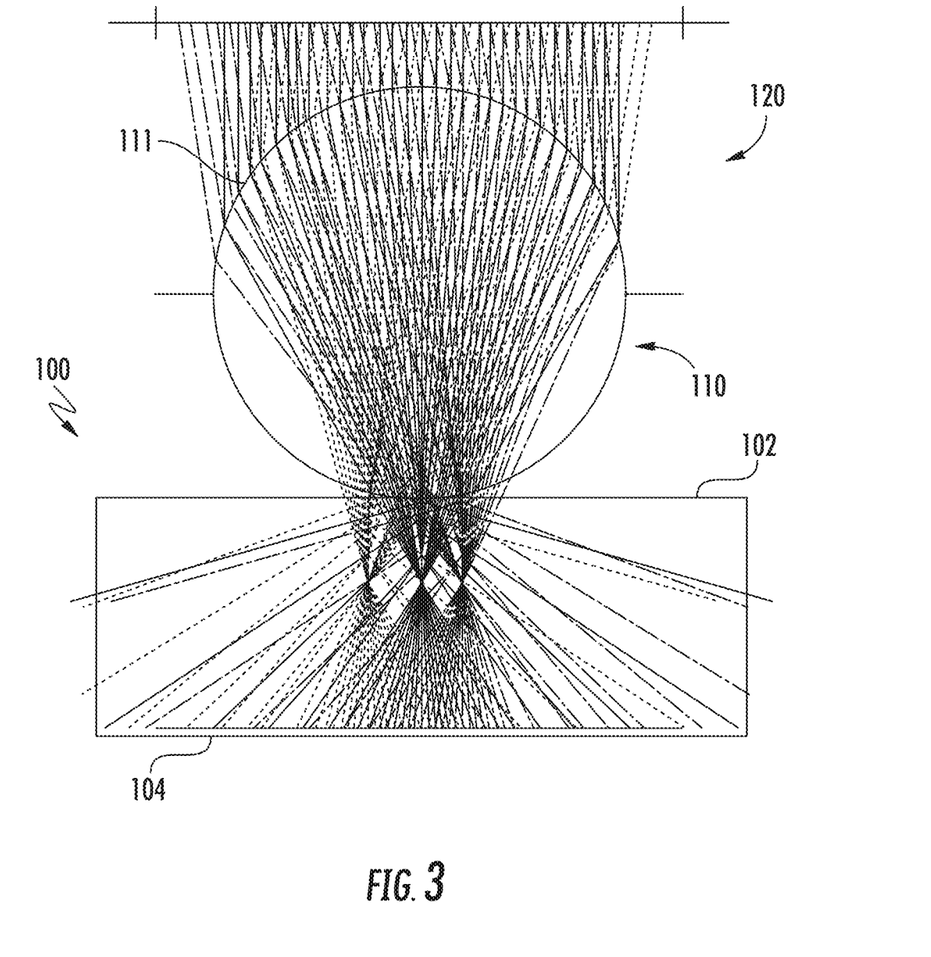
FIG. 3 schematically depicts ray tracing of light of a laser beam focused by the optical fiber depicted by FIG. 2 according to one or more embodiments described and illustrated herein.

The optical fiber 110 has a curved surface, and has a generally circular shape. The shape of the optical fiber 110 enables the optical fiber 110 to act as a cylindrical lens that focuses an incident laser beam 120 at the contact area 113 without a complicated optical delivery system. Referring now to FIG. 3, the example optical fiber 110 of FIG. 2 is shown having a laser beam 120 passing therethrough. The incident laser beam 120 is weakly focused as it enters the optical fiber 110. The curved upper surface 111 of the optical fiber 110 that receives the laser beam 120 focuses the laser beam 120 to a focused diameter at the contact area 113 that is smaller than a size (e.g., diameter) of the initial diameter of the laser beam 120 as the laser beam 120 enters the optical fiber 110 (i.e., at the upper surface 111 of the optical fiber 110). It is noted that the different line types depicting the ray-tracing of the laser beam 120 correspond to different input angles of the coherent laser beam due to the numerical aperture of the focusing lens (not shown). Thus, FIG. 3 schematically depicts how the optical fiber 110 acts as a cylindrical lens that focuses the laser beam, thereby reducing the size of the laser beam at the contact area 113 without the need for complicated optics. The reduction in size of the laser beam causes the film layer 108 (FIG. 2) to be heated quickly and provide the formation of a bond area proximate the contact area 113 (FIG. 2).

The properties of the laser beam 120 should be such that the laser beam melts the material of the substrate 100 at the contact area 113, thereby causing diffusion between the material of the optical fiber 110 and the material of the substrate 100. The laser beam may be a continuous wave (CW) or quasi CW laser beam (i.e., a pulsed laser beam having a high repetition rate). The wavelength of the laser beam 120 should be such that the laser beam 120 is absorbed by the film layer 108 to melt the material of the substrate 100. For example, the wavelength of the laser beam 120 may be in the visible, ultraviolet or near infrared spectral bands. As a non-limiting example, the wavelength of the laser beam 120 may be within a range of about 0.3 to about 1.7 μm, including endpoints.

In some embodiments, a single mode laser source is used to generate the laser beam 120 and the laser beam 120 may be in a range of about 0.5 W to about 10 W including endpoints, and be single mode for focusing by the optical fiber 110. The initial diameter of the laser beam 120 at the upper surface 111 of the optical fiber 110 should be equal to or less than the diameter of the optical fiber 110. In some embodiments, for example, the initial diameter of the laser beam is between about 80 μm and about 400 μm, including endpoints. The duration of time that the laser beam 120 is focused by the optical fiber 110 should be long enough to melt the material of the substrate 100 and to form a bond between the optical fiber 110 and the substrate 100. In some embodiments, the focal point of the laser beam is on the surface of the substrate.

As noted above, in some embodiments, no film layer is utilized to absorb the laser beam. In some embodiments, a high-power sub-picosecond pulsed laser (i.e., a laser having a pulse duration of less than about 1 picosecond) is used without an absorbing film layer. The high-energy pulses melt the material of the substrate 100 without a need for the absorbing film layer. Due to the material non-linearity and multiphoton absorption process, absorption occurs without an absorbing film. Non-limiting example power values of a sub-picosecond pulsed laser include a power density more than about 0.5 GW/cm² with an average power of greater than about 200 mW.

Figure 4:
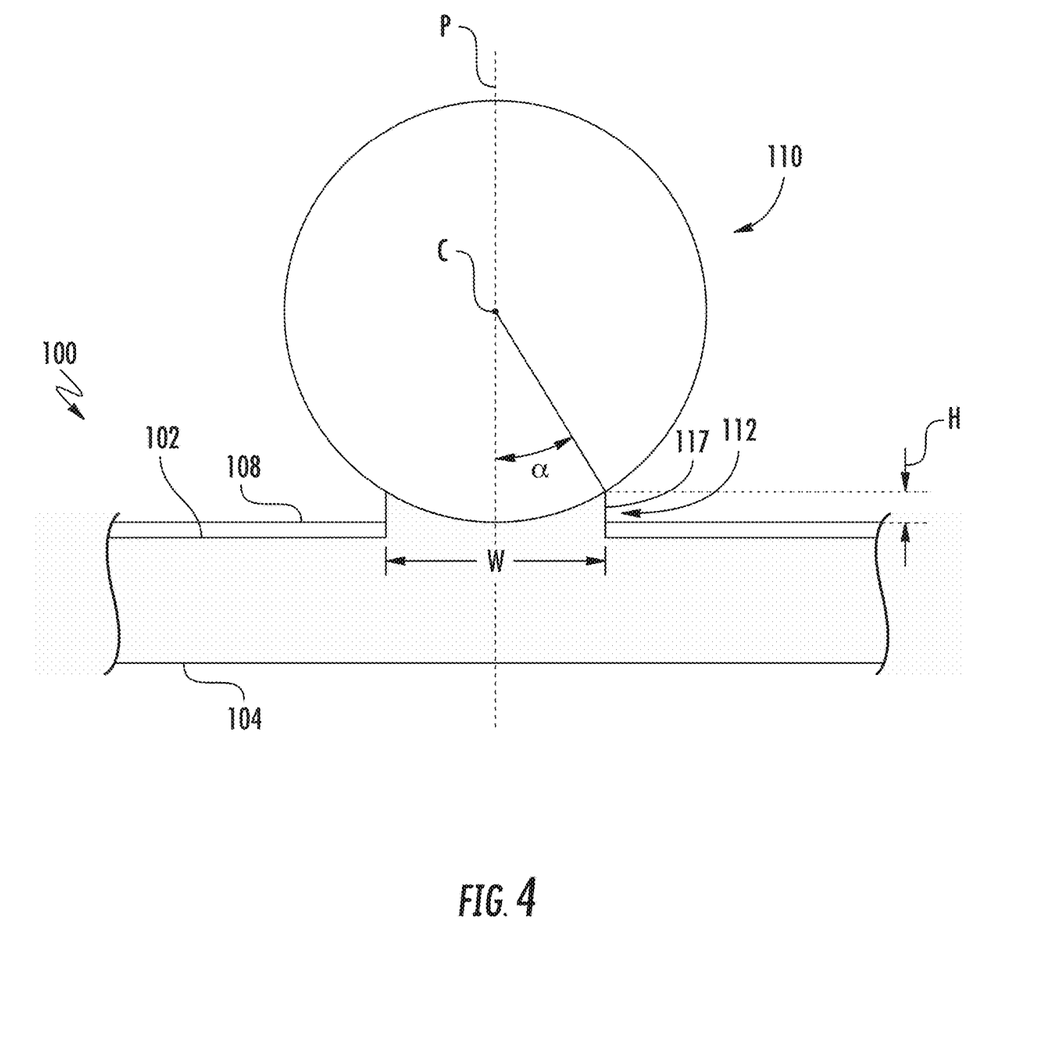
FIG. 4 schematically depicts the optical fiber bonded to the substrate depicted by FIG. 2 using a laser beam according to one or more embodiments described and illustrated herein.

FIG. 4 schematically depicts the optical fiber 110 after it is laser welded to the first surface 102 of the substrate 100 by the laser beam 120. Particularly, FIG. 4 depicts the topography of a bond area 112 that bonds the optical fiber 110 to the substrate 100. The film layer 108 absorbs a wavelength of the laser beam 120, which creates heat that causes the material of the substrate 100 to melt at the contact area 113 (FIG. 2). The melted material of the substrate 100 diffuses into the optical fiber 110, and also flows toward the optical fiber 110, thereby forming a bond area 112 having a height H as measured from the surface of the film layer 108 (or the first surface 102 of the substrate 100 in embodiments in which a film layer is not used) to an edge 117 of the bond area 112 that contacts the optical fiber 110. The height H of the bond area 112 is not limited by this disclosure. As an example and not a limitation, the height H of the bond area 112 may be about 0.2 μm to about 10 μm including end points.

The width W of the bond area 112 is dependent on the diameter of the laser beam 120 after the laser beam 120 is focused by the optical fiber 110 (also called the focused diameter of the laser beam). Additionally, an angle α is defined between a plane P through a center C of the optical fiber 110 and an edge 117 of the bond area 112. The value of the angle α depends on the height H and the diameter of the optical fiber. As a non-limiting example, for a range of the height H may be from about 0.2 μm to about 10 μm and a range of optical fiber diameter from about 80 μm to 400 μm, the range of α is from about 2.6 degrees to about 40 degrees.

As shown in FIG. 4, the bond area 112 is a region of expanded glass that creates a recess matching the shape of the optical fiber 110 and providing significant contact area with the optical fiber 110. This contact area increases the bonding strength of the optical fiber 110 to the first surface 102 of the substrate 100.

Figure 5:
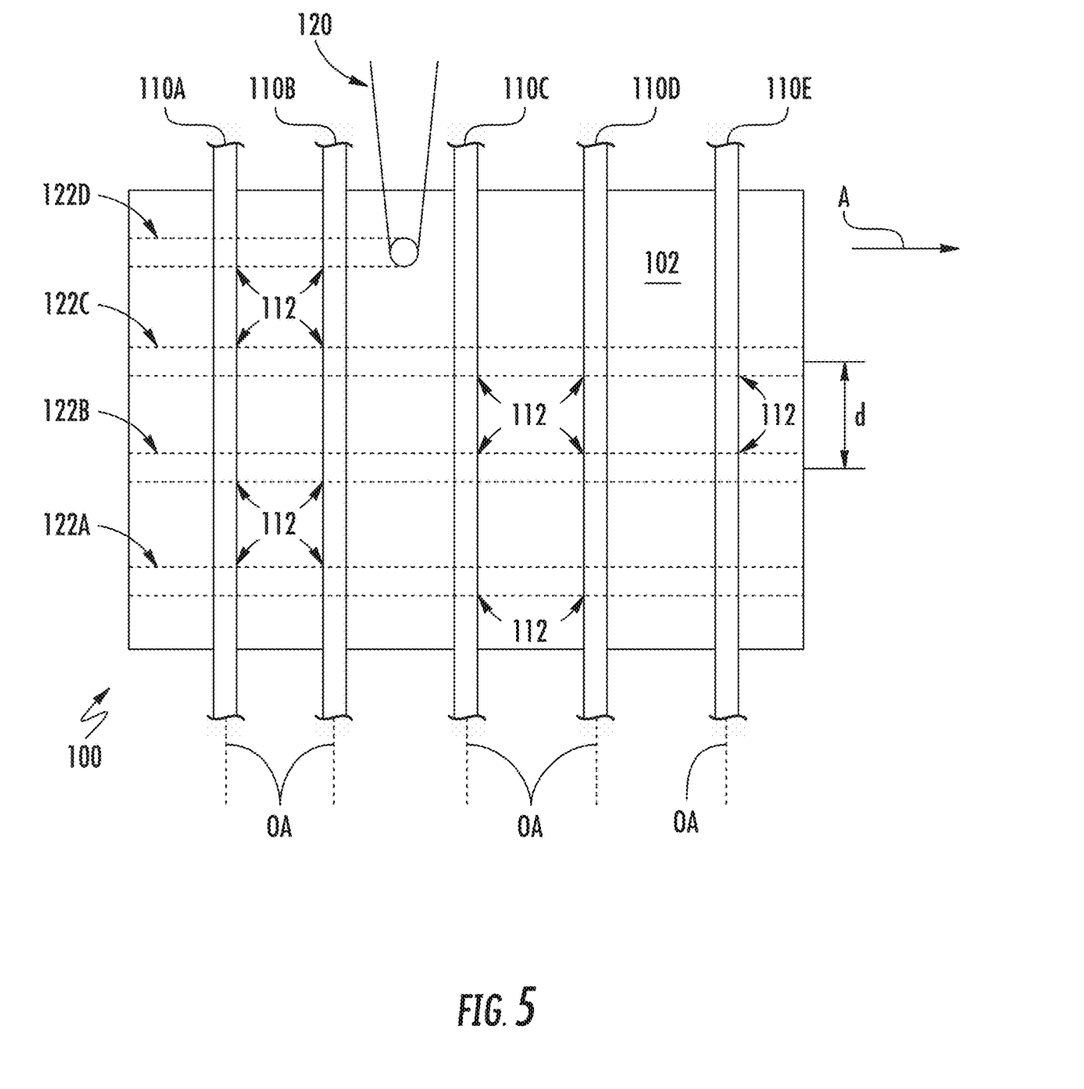
FIG. 5 schematically depicts a top down view of a plurality of optical fibers being bonded to a substrate by a plurality of passes of a laser beam according to one or more embodiments described and illustrated herein.

Multiple optical fibers 110 may be welded to the first surface 102 (and/or the second surface 104) of the substrate 100 to increase bonding strength. FIG. 5 schematically depicts a top-down view of optical fibers 110A-110E disposed on a first surface 102 of a substrate 100. The optical fibers 110A-110E are placed on the surface 102 of the substrate 100. The laser beam 120 or substrate is then moved (or translated) in a first direction (e.g., direction A) that is transverse to a longitudinal axis OA of the optical fibers 110A-110E such that the laser beam passes over the optical fibers 110A-110E to form bond areas 112. In the example of FIG. 5, the direction A of the laser beam 120 is perpendicular to the longitudinal axis OA of the optical fibers 110A-110E. However, embodiments are not limited thereto. It is noted that the laser beam 120 may be translated relative to the substrate 100, or the substrate 100 may be translated relative to the laser beam 120.

The laser beam 120 sequentially traverses and welds multiple optical fibers 110A-110E as it travels along direction A in a first pass 122A. As the laser beam 120 enters an optical fiber 110A-110E, it is focused as described above and creates a bond area 112. In some embodiments the material of the substrate 100 outside of the contact areas between the optical fibers 110A-110E and the substrate 100 is not melted by the laser beam 120. Rather, material is only melted at the contact areas (e.g., contact area 113 as shown in FIG. 2) because of the focusing effect of the optical fibers 110A-110E on the laser beam 120.

As shown in FIG. 5, multiple passes 122A-122D of the laser beam 120 may be performed to weld the optical fibers 110A-110E to the substrate 100 at multiple bond areas 112 along the length of the optical fibers 110A-110E. For example, a position of the laser beam 120 or the substrate 100 may be shifted by a distance d in a direction parallel to the longitudinal axis OA of the optical fibers 110A-110E after completion of a pass (e.g., the first pass 122A) to translate in a second direction to perform a subsequent pass (e.g., the second pass 122B) that may also be transverse to the longitudinal axis A of the optical fibers 11A-110E. The distance d is not limited by this disclosure, and may depend on the desired number of bond areas 112 desired for each optical fiber 110A-110E. After shifting the position of the laser beam 120 or the substrate 100, the laser beam 120 or the substrate 110 is again translated traverse to the longitudinal axis OA of the optical fibers 110A-110E. In FIG. 5, a fourth pass 122D is not yet complete as the laser beam 120 approaches a third optical fiber 110C. As a non-limiting example, the translation speed of the laser beam 120 with respect to the substrate 100 is in the range of about 5 mm/s to 200 mm/s, including endpoints.

Figure 6:
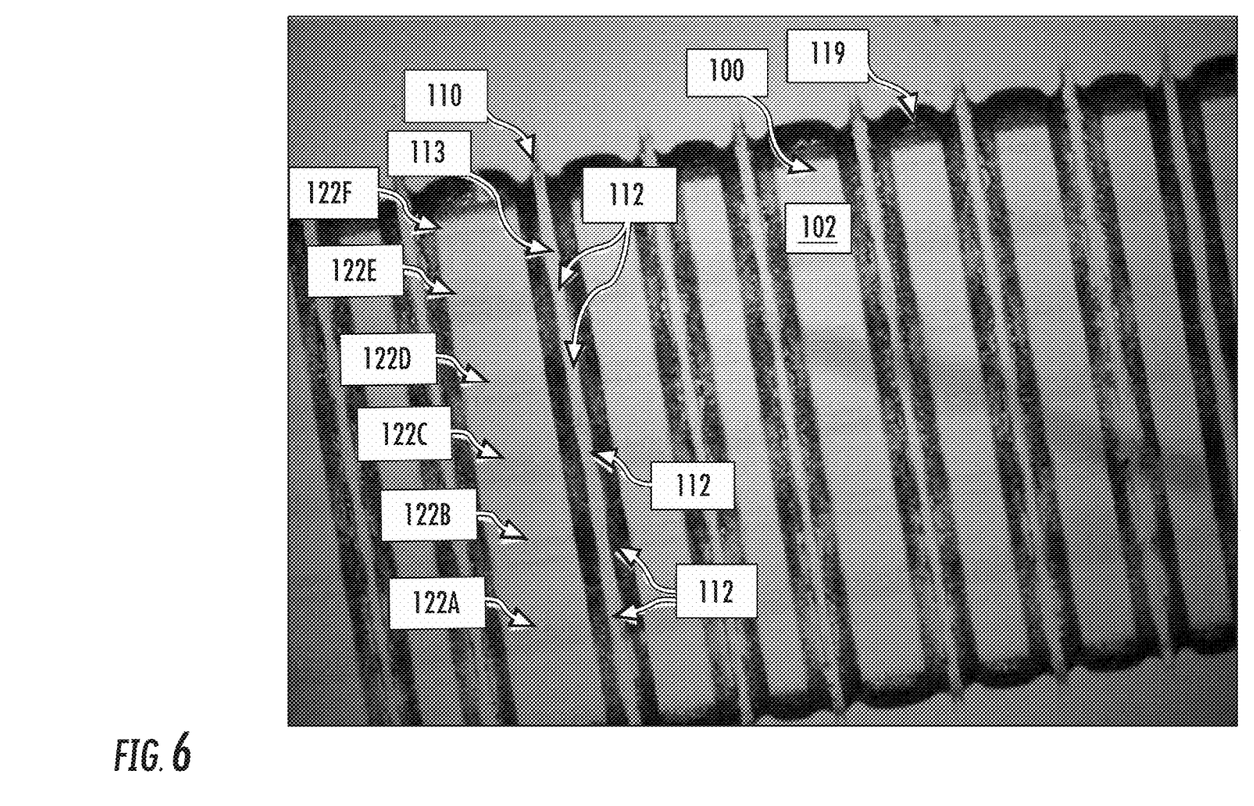
FIG. 6 is a microscope image of a plurality of optical fibers bonded to a substrate by multiple passes of a laser beam according to one or more embodiments described and illustrated herein.

Referring now to FIG. 6, a microscope image of a plurality of optical fibers 110 bonded to a first surface 102 of a substrate 100 is provided. It is noted that the dark regions 119 of the image is index matching fluid. The microscope image of FIG. 6 was taken by disposing the index matching fluid on the first surface 102 of the substrate 100 and then placing a glass substrate on top of the optical fibers 110 such that the optical fibers 110 and the index matching fluid was disposed between the substrate 100 and the glass substrate. In this manner, the optical fibers 110 and their contact areas 113 become visible in the microscope image.

Figure 7:
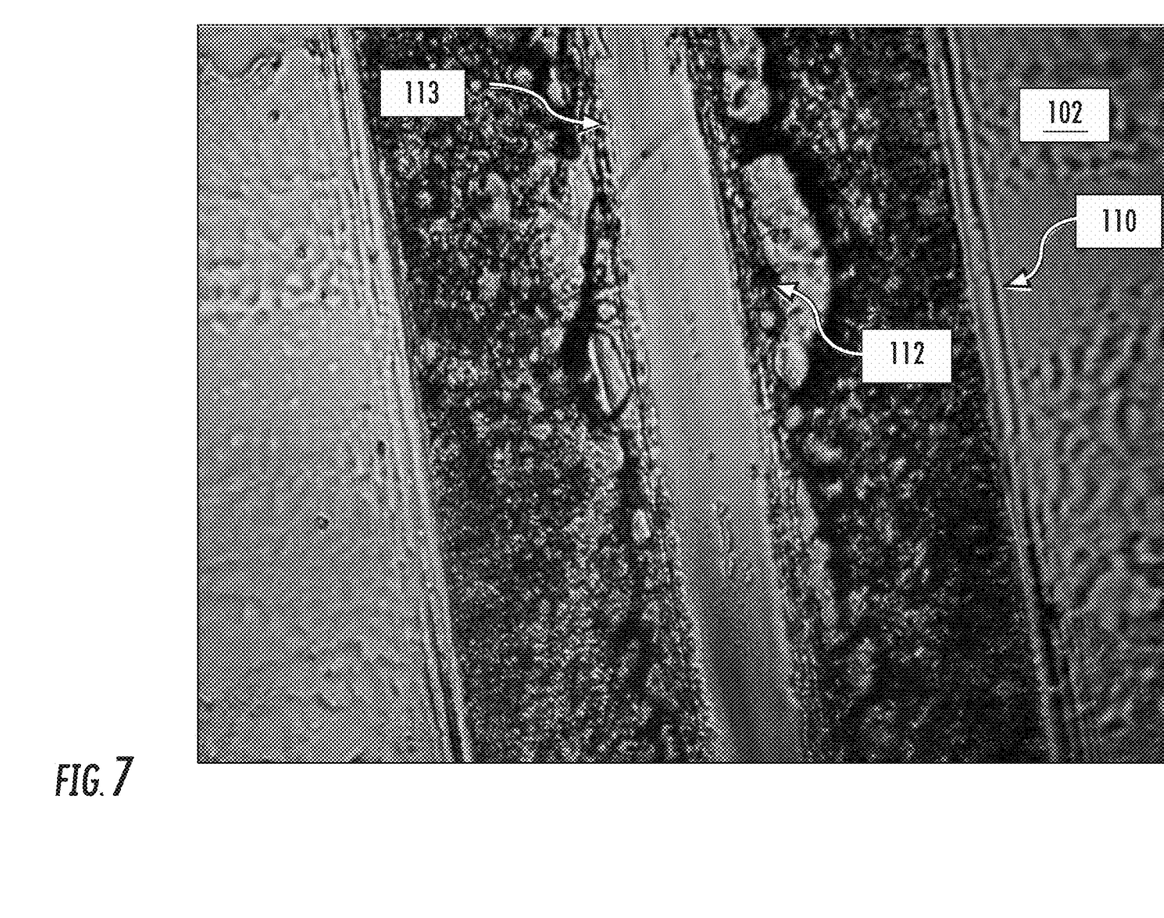
FIG. 7 is a microscope image of a bond area of an optical fiber bonded to a substrate according to one or more embodiments described and illustrated herein.

The substrate 100 shown in FIG. 6 is a 0.7 mm Corning® Eagle XG® glass substrate manufactured and sold by Corning Incorporated. The optical fibers 110 are Corning® SMF-28® optical fibers. A 20 nm thick film layer of stainless steel is disposed on the first surface 102 of the substrate 100 to absorb the laser beam. The laser beam used to weld the optical fibers was a TEM 00 mode 355 nm wavelength laser beam having a power of 2.5 W and translated at a speed of 15 mm/s. Six passes 122A-122F of the laser beam were performed. The darker lines in the image show the path of the six passes 122A-122F. The distance between individual passes 122A-122F was about 0.2 mm. The laser beam 122 welds the optical fibers 110 to the first surface 102 at the bond areas 112. It is noted that not all of the bond areas 112 are labeled in FIG. 6 for ease of illustration. FIG. 7 depicts a close-up microscope image depicting an individual bond area 112. FIG. 7 shows that there is minimal damage to the optical fiber 110 or the substrate 100 at the bond area.

In another example, a 1550-nm single-mode CW laser was used to weld the Corning® SMF-28® optical fibers to the Eagle XG® substrate with the 6 W laser power and 120 mm/s beam scanning speed.

Figure 8:
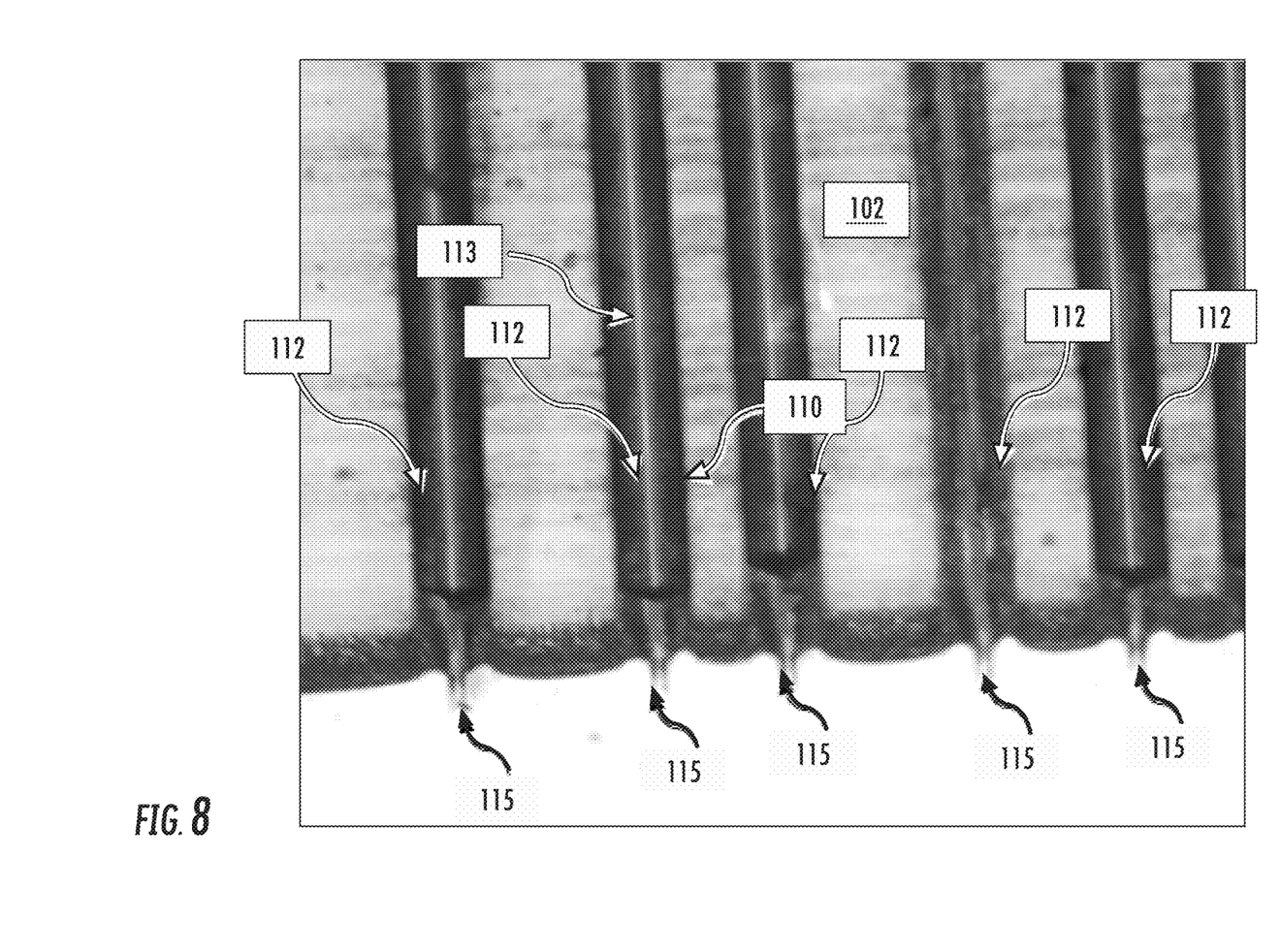
FIG. 8 is a microscope image of broken optical fibers bonded to a substrate by a laser beam illustrating a strength of bond areas that bond the optical fibers to the substrate according to one or more embodiments described and illustrated herein.

The resulting bonds of the optical fibers 110 to the substrate 100 in the example depicted in FIGS. 6 and 7 are strong. FIG. 8 is a close-up microscope image of optical fibers having broken ends 115 that were broken by lifting the optical fibers off of the substrate 100. Rather than being lifted at the bond areas 112 where the optical fibers 110 are bonded to the first surface 102 of the substrate 100, the optical fibers 110 were broken along their length, which is indicative of the bonding strength of the laser processes described herein.

Additionally, it was found that the displacement of the center of the optical fibers 110 at the bond areas was minimal. A Zygo interferometer was used to measure the surface topography of the substrate 100 under the optical fibers 110 as well as the bottoms of the optical fibers 110. Based on the analysis, the displacement of the centers of the optical fibers 110 before bonding the optical fibers 110 to the substrate 100 and after bonding the optical fibers 110 to the substrate 100 is less than 0.2 µm at the bond areas. Thus, the optical fibers 110 remain in substantially the same position after laser welding as before laser welding. Accordingly, the process will lead to increased optical coupling between the optical fibers 110 of the connector and the waveguides to which the optical fibers 110 are connected because the optical fibers 110 are not vertically displaced after welding.

Figure 9:
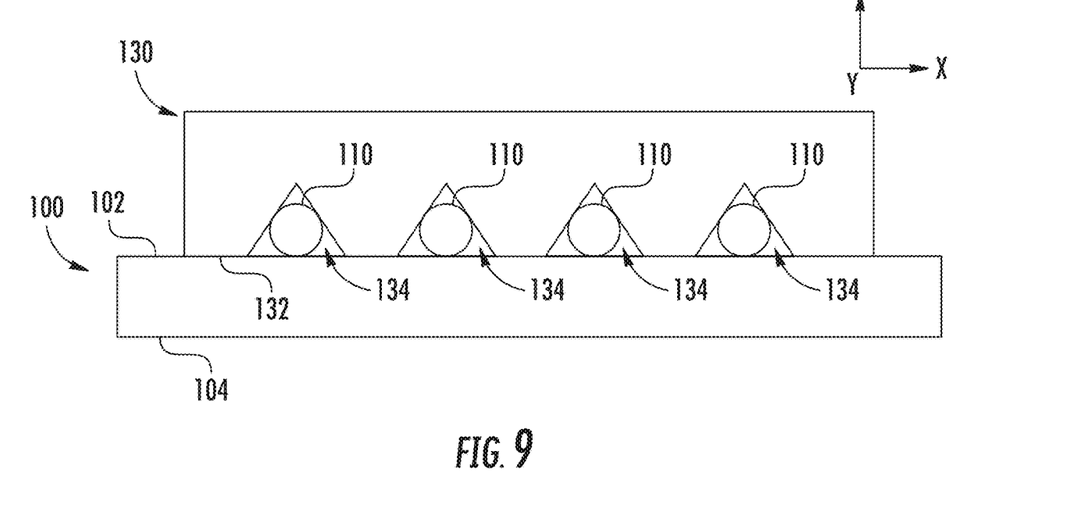
FIG. 9 schematically depicts an end view of a fixture securing a plurality of optical fibers to a substrate prior to bonding the plurality of optical fibers to the substrate by a laser beam according to one or more embodiments described and illustrated herein.
Figure 10:
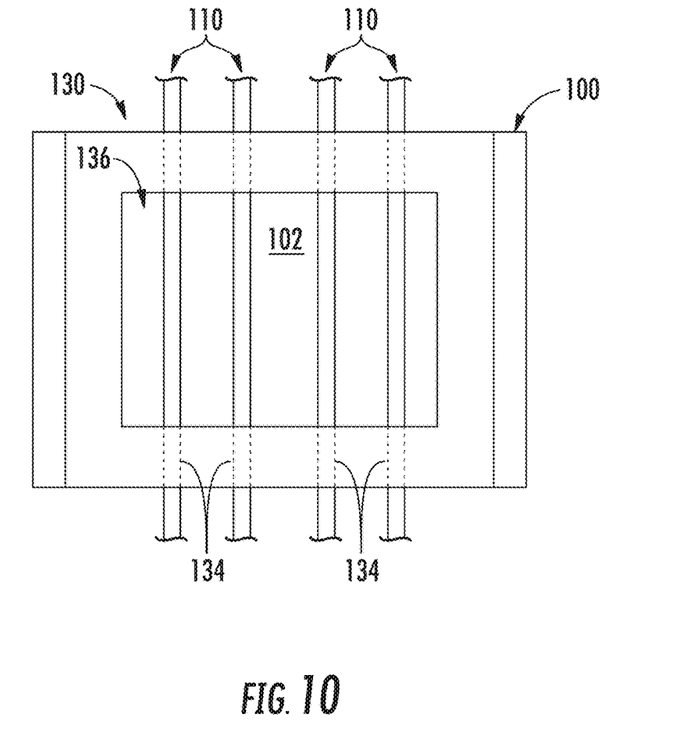
FIG. 10 schematically depicts a top down view of the fixture, optical fibers and substrate depicted in FIG. 9 according to one or more embodiments described and illustrated herein.

Referring now to FIGS. 9 and 10, an example, non-limiting fixture utilized to maintain the optical fibers in desired positions before the laser welding process. FIG. 9 is an end view of an assembly comprising a substrate 100, a plurality of optical fibers 110, and a fixture 130. FIG. 10 is a top-down view of the assembly depicted in FIG. 9. The fixture 130 may be fabricated from any suitable material, such as glass, metal or polymers, for example.

As shown in FIG. 10, the fixture has a bottom surface 132 having a plurality of grooves 134. The fixture 130 is placed on the substrate 100 such that the bottom surface 132 of the fixture 130 contacts the first surface 102 (and/or the second surface) or any film layers that are disposed on the first surface 102. The fixture 130 is placed such that the plurality of optical fibers 110 are positioned within the plurality of grooves 134. The plurality of grooves 134 of the fixture 130 position the plurality of optical fibers 110 at known locations on the x- and z-axis. As a non-limiting example, the precise placement of the fixture 130 on the substrate 100 may be performed by an active alignment process. Once in place, the fixture 130 may be mechanically clamped or otherwise secured to the substrate 100.

Referring now to FIG. 10, the fixture 130 has an open region 136 that exposes the optical fibers 110. The plurality of grooves 134 are interrupted by the open region 136. Thus, the laser beam 120 enters through the open region 136 and may pass over (or be translated across) the exposed optical fibers 110 to weld the optical fibers 110 to the substrate 100. As shown in FIG. 5, multiple passes of the laser beam 120 may be provided in the open region 136 to bond the optical fibers 110 to the substrate at multiple bond areas. After the optical fibers are bonded to the substrate 100, the fixture 130 may be removed from the substrate 100 and the assembly may be further processed.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. An assembly for use in an optical fiber connector, comprising:
a substrate comprising a surface;
an optical fiber bonded to the surface of the substrate;
a film disposed on the surface of the substrate; and
a bond area between the optical fiber and the surface of the substrate, wherein the bond area comprises laser-melted material of the substrate that bonds the optical fiber to the substrate;
wherein the film is capable of absorbing a wavelength of a laser beam to melt the material of the substrate at the bond area.

2. The assembly of claim 1, wherein the film is selected from the group consisting of metal, glass, ZnO, $TiO_2$, $Nb_2O_5$, an electromagnetic-absorbing oxide material, and an electromagnetic-absorbing nitride material.

3. The assembly of claim 1, wherein the film is stainless steel.

4. The assembly of claim 1, wherein the film has a thickness of less than or equal to about 1.5 µm.

5. The assembly of claim 1, wherein the substrate comprises glass.

6. The assembly of claim 1, wherein the substrate comprises silicon.

7. The assembly of claim 1, further comprising one or more additional bond areas positioned along the length of the optical fiber, wherein the one or more additional bond area comprises laser-melted material of the substrate that bonds the optical fiber to the substrate.

8. The assembly of claim 1, further comprising one or more additional optical fibers bonded to the surface of the substrate.

9. An optical fiber connector comprising:
a housing;
a substrate in the housing, the substrate comprising a surface;
an optical fiber bonded to the surface of the substrate;
a film disposed on the surface of the substrate; and
a bond area between the optical fiber and the surface of the substrate, wherein the bond area comprises laser-melted material of the substrate that bonds the optical fiber to the substrate;
wherein the film is capable of absorbing a wavelength of a laser beam to melt the material of the substrate at the bond area.

10. The optical fiber connector of claim 9, wherein the film is selected from the group consisting of metal, glass, ZnO, $TiO_2$, $Nb_2O_5$, an electromagnetic-absorbing oxide material, and an electromagnetic-absorbing nitride material.

11. The optical fiber connector of claim 9, wherein the film is stainless steel.

12. The optical fiber connector of claim 9, wherein the film has a thickness of less than or equal to about 1.5 µm.

13. The optical connector of claim 9, wherein the substrate comprises glass.

14. The optical connector of claim 9, wherein the substrate comprises silicon.

15. The optical connector of claim 9, further comprising one or more additional bond areas positioned along the length of the optical fiber, wherein the one or more additional bond area comprises laser-melted material of the substrate that bonds the optical fiber to the substrate.

16. The optical connector of claim 9, further comprising one or more additional optical fibers bonded to the surface of the substrate.

* * * * *